US011893249B2

(12) United States Patent
Kallam et al.

(10) Patent No.: US 11,893,249 B2
(45) Date of Patent: *Feb. 6, 2024

(54) SYSTEM AND METHOD FOR FLASH AND RAM ALLOCATION FOR REDUCED POWER CONSUMPTION IN A PROCESSOR

(71) Applicant: Ceremorphic, Inc., San Jose, CA (US)

(72) Inventors: Subba Reddy Kallam, Sunnyvale, CA (US); Partha Sarathy Murali, Sunnyvale, CA (US); Venkata Siva Prasad Pulagam, Secunderabad (IN); Anusha Biyyani, Hyderabad (IN); Venkatesh Vinjamuri, Tenil (IN); Shahabuddin Mohammed, Hyderabad (IN); Rahul Kumar Gurram, Secunderabad (IN); Akhil Soni, Kalpi (IN)

(73) Assignee: Ceremorphic, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/691,046

(22) Filed: Mar. 9, 2022

(65) Prior Publication Data

US 2022/0206694 A1 Jun. 30, 2022

Related U.S. Application Data

(63) Continuation of application No. 16/992,098, filed on Aug. 13, 2020, now Pat. No. 11,307,779.

(Continued)

(51) Int. Cl.
*G06F 3/06* (2006.01)
*G06F 12/06* (2006.01)

(52) U.S. Cl.
CPC ............ *G06F 3/0625* (2013.01); *G06F 3/068* (2013.01); *G06F 3/0631* (2013.01); *G06F 12/0646* (2013.01); *G06F 2212/1028* (2013.01)

(58) Field of Classification Search
CPC .......... G06F 3/06; G06F 9/5094; G06F 12/00; G06F 12/0646; G06F 2212/1028; G06F 3/0625; G06F 3/0631; G06F 3/068
See application file for complete search history.

(56) References Cited

U.S. PATENT DOCUMENTS

| 2008/0207196 A1* | 8/2008 | Pettersson ............. H04W 24/00 455/434 |
| 2009/0125737 A1 | 5/2009 | Brey et al. |

(Continued)

FOREIGN PATENT DOCUMENTS

WO  WO-02063810 A1 * 8/2002 ........... H04B 7/2123

OTHER PUBLICATIONS

N. Manjikian, "Dynamic RAM-based programs and tasks in the freescale MQX operating system," 2015 IEEE 28th Canadian Conference on Electrical and Computer Engineering (CCECE), Halifax, NS, Canada, 2015, pp. 706-711.*

(Continued)

*Primary Examiner* — Pierre Michel Bataille
(74) *Attorney, Agent, or Firm* — File-EE-Patents.com; Jay A. Chesavage

(57) ABSTRACT

The present invention is an controller for dynamically allocating RAM between powersave code copied from ROM and transient RAM memory used for storing packets. When the utilization of the transient RAM memory is low, code segments are copied from ROM and executed from RAM using a RAM pointer table which is updated after the code segments are copied over from ROM, and when the utilization of the transient RAM memory is high, code segments are deallocated from RAM and the pointer table is updated to point to the corresponding location in flash ROM.

19 Claims, 2 Drawing Sheets

Related U.S. Application Data

(60) Provisional application No. 62/899,084, filed on Sep. 11, 2019.

(56) References Cited

U.S. PATENT DOCUMENTS

| | | | |
|---|---|---|---|
| 2010/0262799 A1* | 10/2010 | Lasser | G06F 12/0246 |
| | | | 711/E12.103 |
| 2012/0144217 A1 | 6/2012 | Sistla et al. | |
| 2014/0143577 A1 | 5/2014 | Nachimuthu et al. | |
| 2014/0380017 A1* | 12/2014 | Robin | G06F 12/023 |
| | | | 711/171 |
| 2015/0006805 A1 | 1/2015 | Feekes et al. | |
| 2016/0062446 A1 | 3/2016 | Nijhawan et al. | |
| 2016/0232105 A1 | 8/2016 | Goss et al. | |

OTHER PUBLICATIONS

"Implementing Support for Pointers to Private Data in a General-Purpose Secure Multi-Party Compiler", arXiv.org, Sep. 5, 2015.*
Barthelmann et al "Advanced Compiling echniques to Reduce RAM Usage of Static Operating Systems", Universitat Erlangen-Numberg.
Biwas, "Energy-E Client Smart Embedded Memory Design for Iot and AI", Massachusetts Institute of Technology, Jun. 2018.
PCT Search Report PCT/US20/050590.

* cited by examiner

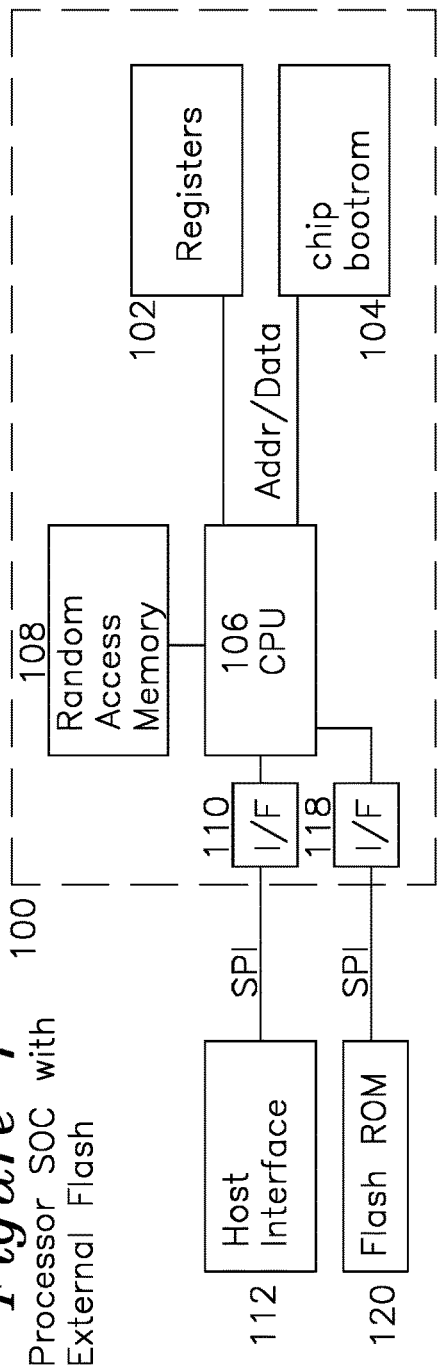
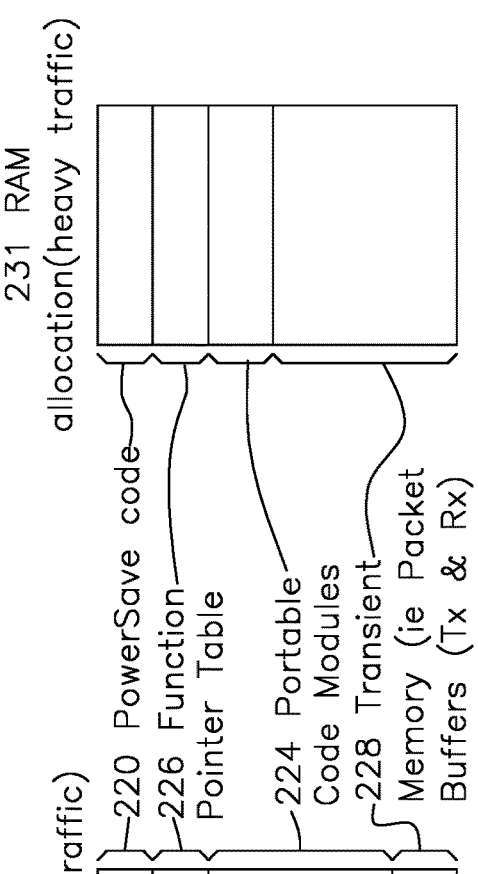
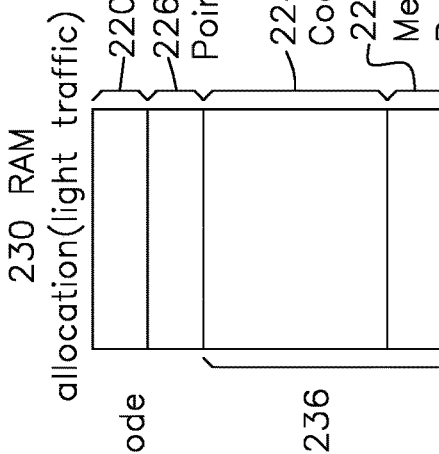
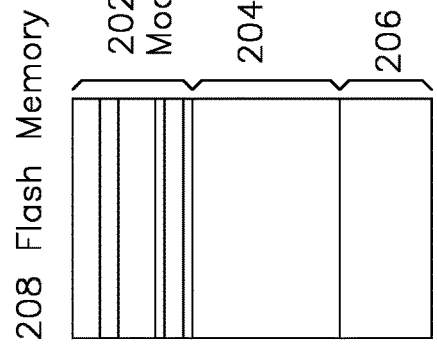

SYSTEM AND METHOD FOR FLASH AND RAM ALLOCATION FOR REDUCED POWER CONSUMPTION IN A PROCESSOR

The present invention claims priority to provisional patent application 62/899,084 filed Sep. 11, 2019.

FIELD OF THE INVENTION

The present invention relates generally to a method for reducing power consumption in a communications system. In particular, the invention relates to management of data in random access memory (RAM) and flash memory to minimize power consumption.

BACKGROUND OF THE INVENTION

For microcontrollers and microprocessors typically have a random access memory (RAM) for storage of temporary data and executable instructions. In current low power or battery powered Internet of Things (IoT) and embedded systems with central processing unit (CPU), there is a tradeoff between optimal power consumption and higher throughput capability. For a CPU having optimal power consumption and network throughput, it is required that RAM memory contain data structures which have dynamic or transient size requirements, such as the packet buffers for transmit and receive packet queues, as well as powersave executable code and data memory. In an embedded System on a Chip (SOC) environment, for reduced power consumption, RAM is intentionally selected to be the smallest size which satisfies the above storage requirements. It is desired to further reduce the power consumption without compromising the performance of tasks requiring transient RAM memory storage requirements, such as network throughput for a communications application, as the power consumption of the microcontroller or microprocessor decreases as less RAM is required by the system or is in use. In another example of the invention, it is desired to provide flexibility in executing code from either flash memory or RAM, so the performance of a software process be optimized for power reduced power consumption or increased performance by dynamic allocation of flash vs RAM for execution of processor instructions. It is further desired to reduce or minimize the power consumption related to the use of RAM.

OBJECTS OF THE INVENTION

A first object of the invention is an apparatus for reducing power consumption in a system having transient requirements for data stored in RAM, the apparatus having a flash memory organized to contain portable code module segments, fixed executable code, and boot code.

A second object of the invention is a method for a processor system on a chip (SOC) for reducing power consumption where data is stored in RAM, the method operative on the SOC having a central processing unit (CPU) coupled to internal RAM and an external flash ROM, the method comprising:

arranging executable code in flash memory as at least one of: portable code module segments, fixed code, and boot code;

the CPU, upon bootup, executing boot code from a chip ROM which places powersave code into RAM, and initializing a function pointer table in RAM to indicate whether a particular portable code module segment should be executed from a flash ROM location or a RAM location, the powersave code periodically determining a utilization ratio being the current transient RAM memory utilization (such as packet buffer utilization) divided by total RAM size to form the utilization ratio, such that:

when the utilization ratio is above a threshold, updating function pointer table entries to point to corresponding portable code modules in Flash ROM, thereafter deallocating portable code module segments from RAM and allocating those deallocated segments to transient RAM such as packet buffers;

when the utilization ratio is below a threshold, moving portable code module segments into RAM and updating a function pointer table to cause the execution of portable code module segments from RAM.

A third object of the invention is an apparatus for dynamic allocation of executable code instructions, the apparatus comprising:

a flash memory organized to contain portable code module segments, fixed executable code, and boot code;

a random access memory (RAM) containing a function pointer table with pointer entries to either the code module segments in flash memory or to a corresponding code module segment in RAM;

a pointer assignment controller for determining a code utilization based on CPU execution, the code utilization identifying a first portable code module for execution from RAM which is currently executing from flash memory and a second portable code module for execution from flash which is currently executing from RAM;

the pointer assignment controller changing a function pointer table entry associated with the second portable code module to point to the associated flash memory portable code module, copying the first portable code module from flash memory to a segment of RAM, and changing the function pointer table associated with the first portable code module to point to the associated segment of RAM.

A fourth object of the invention is an apparatus for dynamic allocation of executable code instructions, the apparatus comprising:

a flash memory organized to contain portable code module segments, fixed executable code, and boot code;

a random access memory (RAM) containing a function pointer table with pointer entries to either the code module segments in flash memory or to a corresponding code module segment in RAM;

a pointer assignment process for determining a code utilization based on CPU execution, the code utilization identifying a portable code module for execution from flash which is currently executing from RAM;

the pointer assignment process changing a function pointer table entry associated with the portable code module to point to the associated flash memory portable code module.

SUMMARY OF THE INVENTION

A system having random access memory (RAM) and flash read only memory (ROM) and providing reduced power consumption comprises:

a CPU coupled to the RAM, the CPU also coupled to the flash ROM;

the flash ROM containing each of:
portable code modules having an entry point address;
fixed code modules;
boot code including power save code;
the RAM having:
a powersave code region,
a callable portable code module region,
a function pointer table region, and
a transient RAM memory region such as a packet buffer;

where, upon power on initialization, the CPU executes boot code from a chip ROM and copies powersave code from the flash memory to the RAM powersave code region, thereafter allocating space in RAM to the transient RAM memory region, copying portable code module segments from the flash ROM to the RAM callable portable code module region and initializing the function pointer table region to point to either a portable code modules segment in flash ROM or to a portable code module segment in RAM, the powersave code thereafter executing preferably from RAM, with the portable code modules executed from either flash ROM or RAM, according to the function pointer table. The powersave code periodically forms a utilization ratio of the size of transient RAM memory in use to total RAM. When the utilization ratio is below a threshold such as 50%, the power save code deallocates transient RAM memory from RAM and allocates it to portable code modules in RAM, copies the corresponding portable code module from ROM to RAM, and updates the function pointer table to point to the corresponding portable code module in RAM. When the utilization ratio is above a threshold such as 50%, the powersave code changes the function pointer table to reference portable code modules in flash ROM and deallocates the associated portable code module from RAM and allocates it as part of the transient RAM memory.

In another example of the invention, a system having random access memory (RAM) and flash read only memory (ROM) and providing reduced power consumption comprises:

a CPU coupled to the RAM, the CPU also coupled to the flash ROM;
the flash ROM containing each of:
portable code modules having an entry point address;
fixed code modules;
boot code including power save code;
the RAM having:
a powersave code region,
a callable portable code module region,
a function pointer table region, and
a transient RAM memory region such as a packet buffer;
where, upon power on initialization, the CPU executes boot code from a chip ROM and copies powersave code from the flash memory to the RAM powersave code region, and starts an execute-from-RAM code optimization process, whereby, when a portable code module which is executed from flash ROM is detected to be called more often than an associated threshold value, the portable code module is copied to the portable code region of RAM and the function pointer table region of RAM is updated with an associated entry point of the portable code module, and when a portable code module which is executed from RAM is detected to be called less often than an associated threshold value, the function pointer table region of RAM is updated to point to the corresponding portable code module in flash ROM.

BRIEF DESCRIPTION OF THE DRAWINGS

FIG. 1 shows a block diagram of a processor SOC with external flash memory.

FIG. 2A shows an example of allocation of flash memory

FIGS. 2B and 2C show examples of allocation of Random Access Memory with a small number and large number of packet buffers, respectively.

DETAILED DESCRIPTION OF THE INVENTION

Figure 3:
FIG. 3 is a flowchart of the operation of the invention.

FIG. 1 shows a block diagram for a process of the present invention and FIG. 2A shows the flash memory 120 and random access memory 108 example space allocations. The present invention provides a system and method for the dynamic allocation of executable functions between system RAM and flash ROM using a function pointer table which indicates whether the function to be executed resides in flash ROM or RAM. In the present examples of the invention, allocation of RAM to transient RAM memory is generally described. Specific examples of transient RAM memory include packet buffer memory in a networking device which maintains transmit and receive buffers, which are not needed in a receive buffer when the receive buffer data is read and processed, and the data in a transmit buffer is not needed after the transmitted data is acknowledged, removing the need for retransmission. The transient RAM memory may be used for memory allocation and deallocation, for example "malloc( )" and "free( )" in the C programming language, or "new" and "delete" in object oriented programming languages such as C++, C#, and Java. The function pointer table and transient RAM memory allocation for networking applications may be done dynamically based on networking stack/application metrics, such as the percentage of RAM occupied by packet buffer memory in active use. In this manner, the RAM 108 is dynamically shared based on utilization percentage between:

1) RAM 230 used for transient RAM memory (shown as packet buffers 228), the packet buffers including long persistent buffers such as TCP transmit and receive buffers, the TCP transmit buffer held pending acknowledgement of transmitted packets by a receiving peer, the TCP receive buffer held until all in-order packets are received from the transmitting peer. Short persistence buffers such as UDP transmit and receive buffers (which are not acknowledged by an associated peer) or control frame buffers which may be processed instantly may be part of a "special pool" because of the short term persistence;

2) all other RAM utilization, including RAM 230 required for powersave (operational) code and data 220, callable functions 224 copied from flash memory 202, and function pointer table 226 indicating whether a particular function called by powersave code 220 should be executed from callable function 224 region or portable code module 202 region of flash memory.

In a typical application, RAM allocation to transient RAM memory is increased because of increased transient RAM memory requirements such as transient RAM memory packet buffer memory, where the packet storage requirement is governed by the nature of network traffic, which comes in bursts, and network conditions. For example, a transient RAM memory transmit buffer may not be deallocated until the related packets being stored have been acknowledged as received by the receiving station or access point (AP). A transient RAM memory network traffic receive buffer may not be deallocated until all packets have been received of a block acknowledgement, or in the case where the receive buffer is used for TCP/IP traffic, the receive packets are held until in-order packets are received and the buffer released. When there is a large burst of traffic or an increased requirement for transmit or receive packet buffers occurs, an increased RAM requirement is needed for the packet buffers. Conversely, when the network is quiet, the RAM requirement falls to the minimum required to store the operational code, referred to as "powersave code" 220, which manages the allocation of RAM between portable code module segments copied over from the flash ROM. Additionally, when there is high throughput traffic to process and forward, the CPU will have fewer opportunities to go into a powersave mode.

FIG. 1 shows an example powersave apparatus and method. Processor System on a Chip (SOC) 100 may include interface 118 to flash read only memory (ROM) 120, for example using a Serial Peripheral Interface (SPI) bus, a host interface 112 operative over interface 110, both of which are connected to a CPU 106. The CPU 106 is coupled to RAM 108, and optionally also to chip bootrom 104 which contains basic instructions for startup, as well as CPU registers 102. Other features are typically present in processor 100, these are shown for example purposes only. the method operates as follows:

1) On startup and initialization, the device may start from chip bootrom 104 which performs basic interface 108 and 110 initialization, and retrieve startup code from a boot code section of the flash ROM 120 which is copied to the RAM 108, after which the CPU executes the powersave code directly from RAM. The organization of flash ROM 120 is shown in 208 of FIG. 2A, and the organization of RAM 108 is shown in 230 of FIG. 2B after initialization or during light wireless traffic utilization, and in FIG. 2C during times of transient RAM memory demands, such as during heavy wireless traffic requiring the allocation of additional packet buffers and deallocating portable code modules for execution directly from flash ROM 120, or for other transient RAM memory requirements. The boot code 206 may include powersave code, which is typically initially copied into segment 220 of RAM 230/231 from which it is subsequently executed, and the power save code includes calls to various functions, which are each directed to function pointer table 226 which is initialized to contain pointers to the associated portable code modules 202 of the flash ROM 120 copied over to the RAM 224. Alternatively, the powersave code may execute from flash ROM 120 and use the function pointer table 226 for portable code modules located in either RAM 108 or flash ROM 120. Initially, when packet buffer 228 utilization is low, as shown in FIG. 2B, the size of the packet buffer 228 may be very small, and the unused space may be filled with portable code modules 202 copied over to RAM as portable code modules 224 of FIG. 2B, and the function pointer table 226 updated to direct function calls from powersave code to the portable code modules 224 copied over to RAM 108. In this manner, the portable code modules executed from RAM 108 will execute much more quickly than when executed from flash ROM 120, thereby providing higher performance. For the transient RAM memory requirement case where packet buffers are allocated as incoming receive packets and outgoing transmit packets are stored in the packet buffer region 228, the RAM packet buffer allocation size 228 will grow as shown in FIG. 2C, and the portable code modules 224 previously executed from RAM 108 will be deallocated and reallocated for packet buffer 228 use, with the function pointer table 226 directing the references to the portable code modules rewritten to point to the associated flash memory 208 portable code module function based on percentage of RAM required for packet buffers 228.

The powersave code 220 monitors the utilization and allocation of packet buffers 228 compared to available allocable RAM 236, and when the ratio of transient RAM memory demand such as packet buffer 228 utilization to allocable RAM 236 exceeds a first threshold such as 50% of RAM utilization because of network throughput, RAM callable function space 224 will be incrementally reduced as one or more portable code module segments are deallocated from RAM, with the function pointer table 226 entries for each corresponding code segment updated to point to flash ROM 208 prior to the deallocation so that code execution is not disrupted. The deallocation may be done by first writing an updated function pointer in the function pointer table 226, and then either waiting an interval of time for any incomplete code execution from RAM to complete, or by having the associated routine set a readable flag upon start of execution and clear the flag upon completion of execution. Thereafter, RAM previously utilized by the deallocated portable code module will be reallocated to increase the size of packet buffers 228.

Conversely, when the ratio of RAM packet buffer allocation 228 to total available allocable RAM 236 falls below a second threshold such as 40%, and the unused packet buffer RAM is available for reallocation, the portable code module segments 202 are copied from ROM 202 and written to the deallocated packet buffer region of RAM 224, and function pointer table 226 entry for each associated portable code module call is updated to point calls to the portable code modules from a flash memory 208 address to RAM 230 address of the associated callable function 224. The powersave code 220 is optimally a contiguous block of code, however the portable code module segments copied from flash ROM 202 are smaller in size, and each may be placed in a non-contiguous location of RAM from any other portable code module segment, since each portable code segment has its own pointer in the function pointer table 226.

In one example of the present invention, the callable functions 224 are one block of RAM separate from packet buffers 228 as shown in FIG. 2, however in an another example of the invention, the packet buffers 228 comprise a linked list which may be in a contiguous RAM space or intermixed with space allocated by callable functions 224. In this example, the size of the packet buffers may be determined by linked list descriptors (each of which may comprise a start node, next node, and size), and the allocated regions for callable functions may be kept in a separate allocation table which may be part of the function pointer table 226, or separate from it.

In one example of the invention, the method for the RAM allocation operates as a series of steps as outlined in FIG. 3, which are shown for the example of packet buffers, but which may be generalized to other applications having transient RAM memory requirements, where the transient RAM memory requirement is for executable code, or the transient RAM memory requirement is for dynamic data. In step 302, the CPU boots from chip bootrom 120, copies the powersave code from flash ROM 120 to RAM 108, initializes the function pointer table 226 of RAM 108, and executes the powersave code 220 from RAM 108. The initial allocation of RAM for the transient RAM memory pool 228 (such as packet buffer pool 228) and portable code modules 224 in RAM in step 302 can be on the order of 70% and 30%, respectively.

In step 303, as new increased transient RAM memory is required, such as when new receive packets arrive, or new packets to be transmitted are created, packet buffer allocation requests create additional packet buffer size 228, and conversely, as transmit packets are sent and acknowledged, or received packets are removed for processing, the packet buffers are deallocated.

Step 304 tests to determine whether the ratio of packet buffer to total RAM exceeds a first threshold such as 60%, and if so, step 306 is performed where the function pointer table 226 is updated to point the associated portable code module segment to the code segment in flash memory 202, RAM 224 for the associated callable function is deallocated, and the RAM it released is allocated to packet buffer RAM 228. In an alternative embodiment of the invention, if the transient RAM memory allocation request is for use by the packet memory for a control packet, management packet, or UDP packet, then the required transient RAM memory packet buffer RAM may be allocated from a special temporary RAM region (not shown, but part of 230), since control packets, management packets, and UDP packets have short persistence memory requirements, as they need not be acknowledged or saved, only passed on to the handling powersave code. If the transient RAM memory allocation such as packet buffer memory allocation request is for TCP data packet then the memory allocation is from the packet buffer memory pool 228, and in an alternative embodiment of the invention, if additional transient RAM memory packet buffer RAM 228 is not available, the packet buffer request may be allocated from a special memory pool (not shown) of RAM 108. The allocation of additional transient RAM memory packet buffer RAM 228 and decrease in portable code module RAM 224 executable from RAM is shown in the transition from FIG. 2B 230 to 2C 231.

Step 308 tests when the ratio of transient RAM memory 228 or packet buffer 228 size to total available allocable RAM 236 is below a second threshold such as 50%, in which case, the powersave code incrementally copies portable code module segments 202 from flash ROM 208 to callable functions 224 in RAM and updates function pointer table 226 so that calls to these functions execute from associated RAM location. Step 310 shows the change in memory allocation from FIG. 2C to FIG. 2B. After the deallocation of transient RAM memory packet buffers and reallocation as portable callable functions and the copying of the functions from ROM to RAM is complete, the function pointer table 226 is updated.

After step 310, the process continues at step 303, or step 304 if allocation and deallocation of step 303 were previously performed and completed in steps 306 and 310, optionally with a delay in each iteration. In this manner, the RAM 108 size may be reduced to the minimum required to support the packet buffer plus function pointer table and powersave code, thereby saving power over prior art methods of maintaining static RAM allocations or executing code modules exclusively from ROM or flash.

It is understood that the examples given are illustrative and not intended to limit the scope of the invention. The first and second thresholds may vary by an order of magnitude of x, such that the threshold may within the range of an order of magnitude larger (10x) or smaller (x/10) than the nominal size x. Alternatively, the thresholds may be approximately the nominal size given, where approximately is in the range of 4x or x/4. In one example of the invention, the first threshold is in the range 40% to 60%, and the second threshold is in the range of 20% to 40%. In another example of the invention, the second threshold is less than the first threshold.

We claim:

1. A process operative on a Central Processing Unit (CPU) coupled to a flash memory containing portable code modules, the CPU also coupled to a Random Access Memory (RAM), the process comprising:

the CPU executing powersave code from a region of flash memory to a region of RAM, the CPU thereafter executing the powersave code from the region of RAM;
the CPU copying portable code modules from a region of flash memory to a region of RAM;
the CPU initializing pointers in a region of RAM indicating whether each portable code module is to be executed from a region of flash memory or from a region of RAM;
the CPU allocating transient RAM memory for the storage of data;
the CPU periodically examining a ratio of a size of the transient RAM memory in use to a total RAM size;
if the ratio is greater than a first threshold:
deallocating a region of the RAM used for portable code modules, updating associated pointers to point to corresponding portable code modules in the flash memory, and also allocating the deallocated region of RAM used for portable code modules to transient RAM memory.

2. The process of claim 1 where, when the ratio is less than a second threshold:
allocating a region of RAM for portable code modules, copying portable code modules to the allocated region of RAM, and updating the pointers to point to corresponding portable code modules in the allocated region of RAM.

3. The process of claim 2 where the second threshold is in a range from 20% to 40%.

4. The process of claim 2 where the second threshold is less than the first threshold.

5. The process of claim 1 where the first threshold is in a range from 40% to 60%.

6. A power saving processor, the power saving processor comprising:
a Central Processing Unit (CPU) coupled to a chip bootrom;
flash memory containing boot code, fixed code, and portable code segments;
Random Access Memory (RAM) having a function pointer table, executable powersave code, and a shared region allocated for transient RAM memory and also callable functions;
the function pointer table initially configured to contain pointers to associated flash memory portable code segments;
the powersave code instructing the CPU to periodically examine a ratio of a size of the RAM region which has been allocated for callable functions to a total RAM size to form an allocation ratio;
and where, when the allocation ratio is below a threshold, the function pointer table configured to point to callable functions in the RAM, the callable functions copied from the flash memory portable code segments;
and where, when the allocation ratio is above a threshold, the function pointer table updated to point to a corresponding portable code segment in the flash memory.

7. The power saving processor of claim 6 where, when the allocation ratio is above a first threshold, the powersave code identifying at least one RAM region callable function copied from a flash memory portable code segment;
updating an associated pointer in the function pointer table to point to the identified flash memory portable code segment;
deallocating a corresponding RAM region used by the at least one RAM region callable function and allocating the deallocated corresponding RAM region to the transient RAM memory region.

8. The power saving processor of claim 7 where the first threshold is in a range from 40% to 60%.

9. The power saving processor of claim 7 where, when the allocation ratio is below a second threshold, the powersave code:
   deallocating a segment of transient RAM memory;
   allocating the deallocated segment of transient RAM memory to a region of RAM callable function memory;
   copying at least one portable code module segment from the flash memory to the callable function region of the RAM;
   updating a pointer in the function pointer table to direct calls to the portable code segment copied from the flash memory to the callable function region of the RAM.

10. The power saving processor of claim 9 where the second threshold is in a range from 20% to 50%.

11. The power saving processor of claim 9 where the first threshold or the second threshold is updated periodically.

12. The power saving processor of claim 6 where the chip bootrom contains executable code for initializing the function pointer table.

13. The power saving processor of claim 6 where the chip bootrom initializes the function pointer table and the powersave code copies portable code segments from flash memory to a callable function region of RAM.

14. The power saving processor of claim 6 where the executable powersave code is configured to select an allocation ratio which minimizes power consumption of the power saving processor.

15. Downloadable computer instructions configured to control a system comprising:
   random access memory (RAM);
   flash memory;
   a Central Processing Unit (CPU) coupled to the RAM, the CPU having a CPU chip ROM, the CPU also coupled to the flash memory;
   the flash memory containing:
      executable portable code modules having an entry point address;
      executable fixed code modules;
      boot code including powersave code;
   the RAM having a powersave code region, a callable portable code module region, a function pointer table region, and a transient RAM memory region;
   the downloadable computer instructions configured to cause:
   the CPU to execute boot code from the CPU chip ROM and also to copy powersave code from the flash memory to the powersave code region in the RAM;
   the CPU operative to allocate space in the RAM to the transient RAM memory region, the CPU operative to copy portable code module segments from the flash memory to the RAM callable portable code module region, the CPU operative to initialize the function pointer table region to point to either a portable code module segment in the flash memory or to a corresponding portable code module segment in a portable code module region of the RAM;
   the CPU operative to execute the powersave code from RAM;
   the CPU operative to execute the portable code modules from at least one of the flash memory or the RAM, as indicated by a corresponding pointer in the function pointer table;
   where the CPU is operative to periodically compute a utilization ratio based on a ratio of a size of transient RAM memory used by power save code plus a size of callable portable code plus a size of the function pointer table plus a size of transient RAM memory divided by a total RAM size;
   and where the CPU is operative to deallocate transient RAM memory from RAM and allocate at least some of the deallocated transient RAM memory to portable code modules in the RAM, copy the corresponding portable code module from the flash memory to the RAM, and update the function pointer table to point to the corresponding portable code module in the RAM when the utilization ratio is below a first threshold.

16. The downloadable computer instructions of claim 15 where the CPU is operative to change the function pointer table to reference the portable code modules in the flash ROM and deallocate the associated portable code module from the RAM and allocate the associated portable code module memory to the transient RAM memory region when the utilization ratio is above a second threshold.

17. The downloadable computer instructions of claim 15 where the first threshold is in a range from 40% to 60%.

18. The downloadable computer instructions of claim 15 where the second threshold is in a range from 20% to 50%.

19. The downloadable computer instructions of claim 15 where:
   the CPU is operative to deallocate the transient RAM memory from the RAM and allocate at least some of the deallocated transient RAM memory space to the portable code modules in the RAM, copy the corresponding portable code module from the flash memory to the RAM, and update a pointer in the function pointer table to point to a corresponding portable code module in the RAM when the utilization ratio is below a first threshold;
   the CPU is operative to change a pointer in the function pointer table to reference portable code modules in the flash memory and deallocate the associated portable code module from the RAM and allocate the associated portable code module memory to the transient RAM memory when the utilization ratio is above a second threshold;
   and where the first threshold is greater than the second threshold.

\* \* \* \* \*